Patented Oct. 27, 1936

2,058,649

UNITED STATES PATENT OFFICE 2,058,649

MANUFACTURE OF PHENOL-ALDEHYDE RESINS

George H. Wilder, Arlington, N. J., assignor, by mesne assignments, to E. I. du Pont de Nemours & Company, Wilmington, Del., a corporation of Delaware No Drawing. Application June 5, 1936, Serial No. 83,714

5 Claims. (Cl. 260—4)

This invention relates to the manufacture of phenol-aldehyde resins and, more particularly, to a method of eliminating or reducing the tendency of such resins to be discolored by heat or by light.

Phenol-aldehyde resins are manufactured by the general process comprising condensing phenol and an aldehyde such as formaldehyde or acetalydehyde, in an aqueous medium and, subsequently, dehydrating the condensation product. The art practices innumerable variations of temperature proportions, specific aldehydes, pH values, and the like, in this general process. In the manufacture of these resins there has always been a considerable problem in avoiding discoloration of the resin either during the course of manufacture or subsequently during exposure to heat or to light.

This discoloration of the resin is generally thought in the art to be due to the presence of inorganic impurities, particularly copper and iron, in the resin. Heretofore, efforts to overcome this tendency of these resins to discolor have been made along the lines of improving the impurity of the ingredients and in selecting equipment that will not contribute impurities. The avoidance of impurities in this manner has been achieved only at considerable added expense and has not been consistently satisfactory.

An object of the present invention is to provide a simple and reasonably economical process of consistently reducing the tendency of phenol-aldehyde resins to discolor upon exposure to heat and/or light. A further object is to provide such a process which can be readily employed in the manufacture of these resins generally without regard to such specific variations in the general process of preparing the resins as are practiced in the art. Other objects of the invention will be apparent from the description given hereinafter.

The above objects are accomplished according to the present invention by adding to the aqueous reaction mixture of phenol and the aldehyde, a water soluble ferrocyanide and salicylic acid, and carrying out the condensation and dehydration in an atmosphere of an inert gas. Preferably the aqueous mixture of phenol and aldehyde is deaerated, prior to the condensation reaction, by bubbling an inert gas therethrough as well as conducting the condensation and dehydration in an atmosphere of inert gas.

It has been discovered that, despite the existing doubt as to exactly what causes the discoloration of these resins, the tentency of the resins toward discoloration is practically eliminated under exposure to ordinary conditions by the introduction into the reaction mixture of the combination of a water soluble ferrocyanide, such as potassium ferrocyanide, and salicylic acid, and carrying out the condensation and dehydration in an atmosphere of an inert gas such as nitrogen. It is believed the reason for this is because the ferrocyanide and salicylic acid tie up any iron or copper present in the form of insoluble compounds. Regardless of what the specific reaction is, the ferrocyanide and salicylic acid form compounds which have a slightly bluish-green color which, rather than being a disadvantage, is highly advantageous in masking the slight reddish or yellowish discoloration which tends to develop in the manufacture of these resins. It is thought that the inert gas adds to the effectiveness of the process because, by displacement of oxygen, it eliminates any opportunity of the former to react with phenol; also it is thought that, by preventing the oxidation of ferrous iron to ferric iron and cuprous copper to cupric copper, the reactions causing discoloration of the resin are, to some extent, inhibited.

While the present invention is applicable to the general process of forming phenol-aldehyde resins by condensation in aqueous medium and subsequent dehydration, the following example is given to illustrate a specific embodiment of the invention:

Example 1.—A mixture of 13.5 pounds of phenol and 25.5 pounds of an aqueous formaldehyde solution of 37.2% strength, is thoroughly deaerated by passing nitrogen gas therethrough and, thereafter, nitrogen gas is bubbled slowly through the mass throughout the duration of the reaction up to and including the step of dehydration. To the deaerated initial mixture are added 15 cc. of an aqueous potassium ferrocyanide solution of 1% strength and 30 grams of salicylic acid. Dilute potassium hydroxide solution is now added to adjust the pH of the mixture to about 6.9. The mass is then heated under a reflux condenser to effect the condensation between the phenol and formaldehyde. The completion of the first stage of the reaction is then determined by any of the control methods familiar in the art and at the end thereof, 250 cc. of 80% lactic acid is added to the reaction mixture which greatly depresses its pH value.

The mass is then subjected to dehydration by the continuance of heat, assisted by the application of a vacuum. Dehydration is continued until the viscosity of the syrup formed and the approximate cessation of foaming indicate that the mass has reached the proper condition to be poured. It is then poured off into suitable molds and the masses in the molds are hardened or cured by being subjected to a temperature of 80° C. for four days. The resulting resin, as removed from the mold, is water white and is not subject to discoloration by light or heat under ordinary conditions.

It will be understood that the above example is merely illustrative and that the invention is applicable generally to the formation of phenol-formaldehyde resins. The phenol and formaldehyde may be used in different relative proportions and other pH values may be maintained during the condensation and dehydration. Also, other specific variations of procedure to facilitate formation of the resin, or to modify its properties, may be employed.

As those skilled in the art will recognize, it is not feasible to state the exact amount of water soluble ferrocyanide and salicylic acid required in each instance since the amount of these reagents depends upon the amount of impurities in the raw materials and the amount of impurities picked up during the manufacture of the resins. In practice, through variation of the proportion of these reagents in the first several batches of resin made, the amount to be used in subsequent batches employing the same raw material, same process, and the same apparatus, can be fairly accurately determined.

There is no object to be gained in using more of the water soluble ferrocyanide and salicylic acid than needed to obtain the desired result. However, since an excess of these two reagents does no injury, it is a practical expedient to employ a quantity great enough to provide a factor of safety in case of unexpected variation in the percentages of color forming impurities in the batch.

Based on the weight of finished resin, it is found that the following percentages, by weight, of the anhydrous reagents are ordinarily to be preferred; for water soluble ferrocyanide the preferred range is 0.001% to 0.002% by weight of the finished resin and ordinarily a range of 0.001% to 0.005% will not have to be exceeded. For salicylic acid the preferred range is 0.30% to 0.40% by weight of the finished resin, while a proportion of 0.20% to 0.80% would ordinarily not have to be exceeded. Actually, the proportions above with respect to the water soluble ferrocyanide are based on the use of potassium ferrocyanide so that, when other water soluble ferrocyanides are employed, they would be taken in chemically equivalent amounts which would, of course, vary slightly from the percentages above.

The preferred inert gas to be employed in the process of the present invention is nitrogen, based upon considerations of cost, safety, and control. Carbon dioxide is not desirable as it is hardly an inert gas due to the effect it exerts upon the pH value of the reaction mixture. Hydrogen, carbon monoxide, or other inflammable gas, although operative enough, contribute an undesirable fire hazard; toxic gases are likewise undesirable and the rare inert gases are excluded, in practical operation, by their cost.

To obtain the best results according to the present invention, the reaction mixture should be thoroughly deaerated prior to the condensation reaction and this can be accomplished by bubbling nitrogen gas vigorously through the aqueous reaction mixture for about 10 minutes. Thereafter, during the condensation, a slow bubbling of the inert gas through the reaction mixture is preferred. During dehydration it is customary to keep the reaction mixture under reduced pressure, in which event it is no longer necessary to keep bubbling nitrogen through the mass as there is little opportunity for oxygen to come in contact with the mass. Needless to say, in the latter stages of the dehydration step, the mass becomes so solid as to preclude the bubbling of an inert gas through it.

An advantage of the present invention is that it provides a simple and quite inexpensive method of largely avoiding in cast resins of the phenol-formaldehyde type the tendency toward discoloration by sunlight and heat. A further advantage of the invention is that it makes feasible the use of raw materials in the manufacture of these resins which materials would not have a high enough degree of purity to be acceptable in manufacturing resins without employing the present process.

As many apparently widely different embodiments of this invention may be made without departing from the spirit and scope thereof, it is to be understood that the invention is not limited to the specific embodiments thereof except as defined in the appended claims.

I claim:

1. In the manufacture of phenol-aldehyde resins by condensing phenol and an aldehyde in an aqueous medium and dehydrating the condensation product, the steps comprising adding a water soluble ferrocyanide and salicylic acid to said aqueous medium, and carrying out said condensation and dehydration in an atmosphere of inert gas.

2. In the manufacture of phenol-formaldehyde resins by condensing phenol and formaldehyde in an aqueous medium and dehydrating the condensation product, the steps comprising adding a water soluble ferrocyanide and salicylic acid to said aqueous medium, and carrying out said condensation and dehydration in an atmosphere of nitrogen.

3. In the manufacture of phenol-formaldehyde resins by condensing phenol and formaldehyde in an aqueous medium and dehydrating the condensation product, the steps comprising deaerating the mixture of phenol and formaldehyde in aqueous solution prior to the condensation reaction by passing through said solution an inert gas, adding a water soluble ferrocyanide and salicylic acid to said solution, and carrying out said condensation and dehydration in an atmosphere of inert gas.

4. In the manufacture of phenol-formaldehyde resins by condensing phenol and formaldehyde in an aqueous medium and dehydrating the condensation product, the steps comprising adding 0.001% to 0.005%, by weight of the finished resin, of potassium ferrocyanide, and 0.20% to 0.80%, by weight of the finished resin, of salicylic acid to said aqueous medium, and carrying out said condensation and dehydration in an atmosphere of nitrogen.

5. In the manufacture of phenol-formaldehyde resins by condensing phenol and formaldehyde in an aqueous medium and dehydrating the condensation product, the steps comprising deaerating the aqueous solution of phenol and formaldehyde prior to condensation by passing through said solution nitrogen gas, adding 0.001% to 0.005%, by weight of the finished resin, of potassium ferrocyanide, and 0.20% to 0.80%, by weight of the finished resin, of salicylic acid to said solution, and carrying out said condensation and dehydration in an atmosphere of nitrogen.

GEORGE H. WILDER.